United States Patent [19]
Wada et al.

[11] Patent Number: 5,761,519
[45] Date of Patent: Jun. 2, 1998

[54] PORTABLE COMPUTER HAVING A REMOVABLE MEDIUM DRIVE AND A RESUME SETTING FUNCTION

[75] Inventors: Masamichi Wada, Tokyo; Yoshiaki Abe, Hidaka, both of Japan

[73] Assignee: Kabushiki Kaisha Toshiba, Kawasaki, Japan

[21] Appl. No.: 609,127

[22] Filed: Feb. 29, 1996

[30] Foreign Application Priority Data

Mar. 3, 1995 [JP] Japan .................................. 7-044590

[51] Int. Cl.⁶ .................................................. G06F 1/32
[52] U.S. Cl. ................................. 395/750.07; 711/161
[58] Field of Search ........................... 395/750; 711/161

[56] References Cited

U.S. PATENT DOCUMENTS

| | | | |
|---|---|---|---|
| 5,212,633 | 5/1993 | Franzmeier | 395/500 |
| 5,276,090 | 1/1994 | Arai | 395/750 |
| 5,339,444 | 8/1994 | Nakajima | 395/750 |
| 5,365,502 | 11/1994 | Misono | 369/18 |
| 5,463,601 | 10/1995 | Yanagisawa | 364/32 |
| 5,577,205 | 11/1996 | Hwang et al. | 395/200.01 |

FOREIGN PATENT DOCUMENTS 4-254959  9/1992  Japan.

*Primary Examiner*—Ayaz R. Sheikh
*Assistant Examiner*—David A. Wiley
*Attorney, Agent, or Firm*—Finnegan, Henderson, Farabow, Garrett & Dunner, L.L.P.

[57] ABSTRACT

In an enabled resume mode, the drive status, head position and recording data amount of a CD-ROM drive are saved in a system memory when the power supply of a system is turned off. When the power supply is turned on, it is determined based on a data recording capacity whether a currently-set CD-ROM is identical with one set when the power supply is turned off. If it is determined that they are not identical, a resume error occurs only in the CD-ROM drive, and the configurations of systems other than the CD-ROM drive are resumed on the basis of information saved in the system memory, thereby preventing the whole system from being hung up.

14 Claims, 3 Drawing Sheets

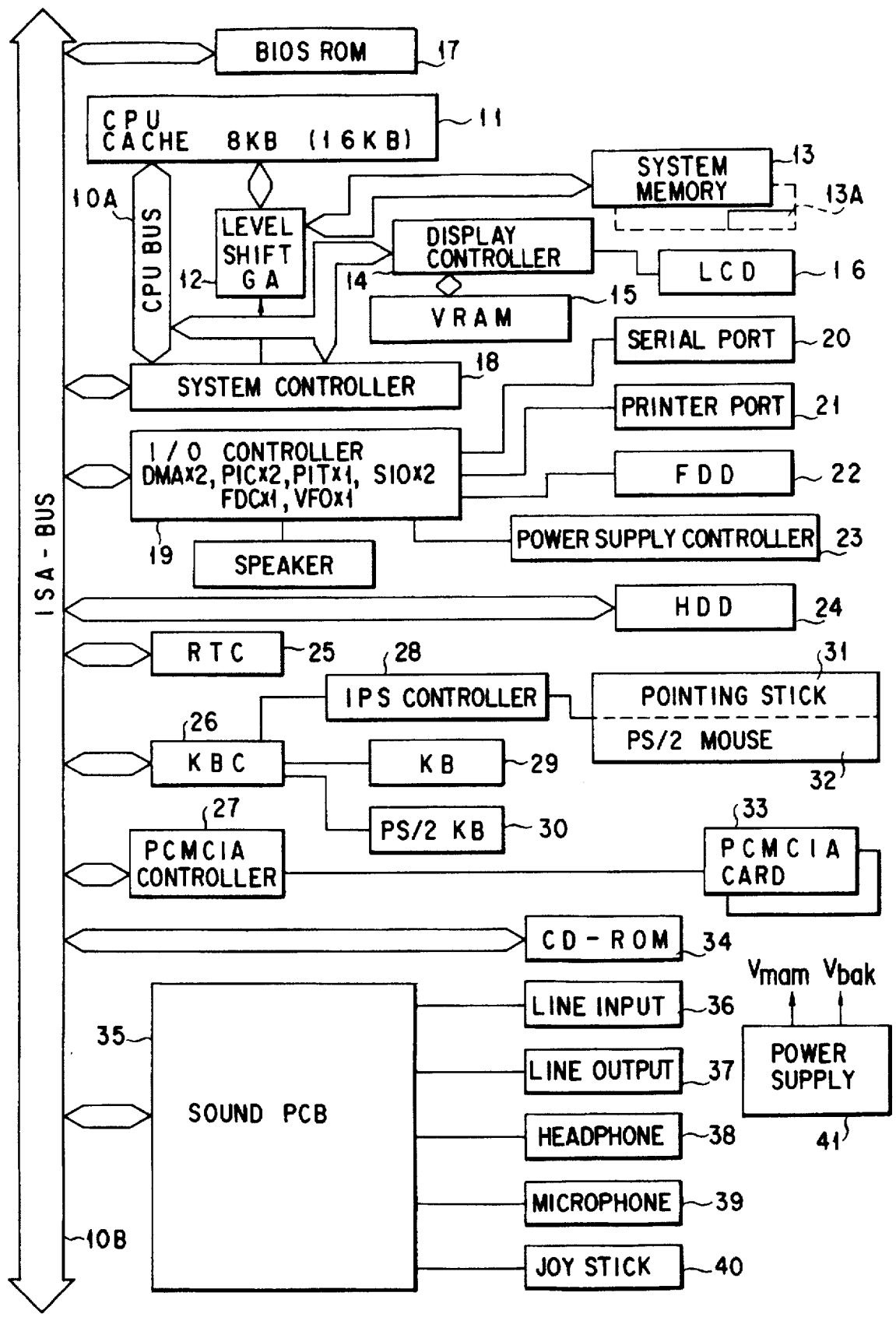
F I G. 1

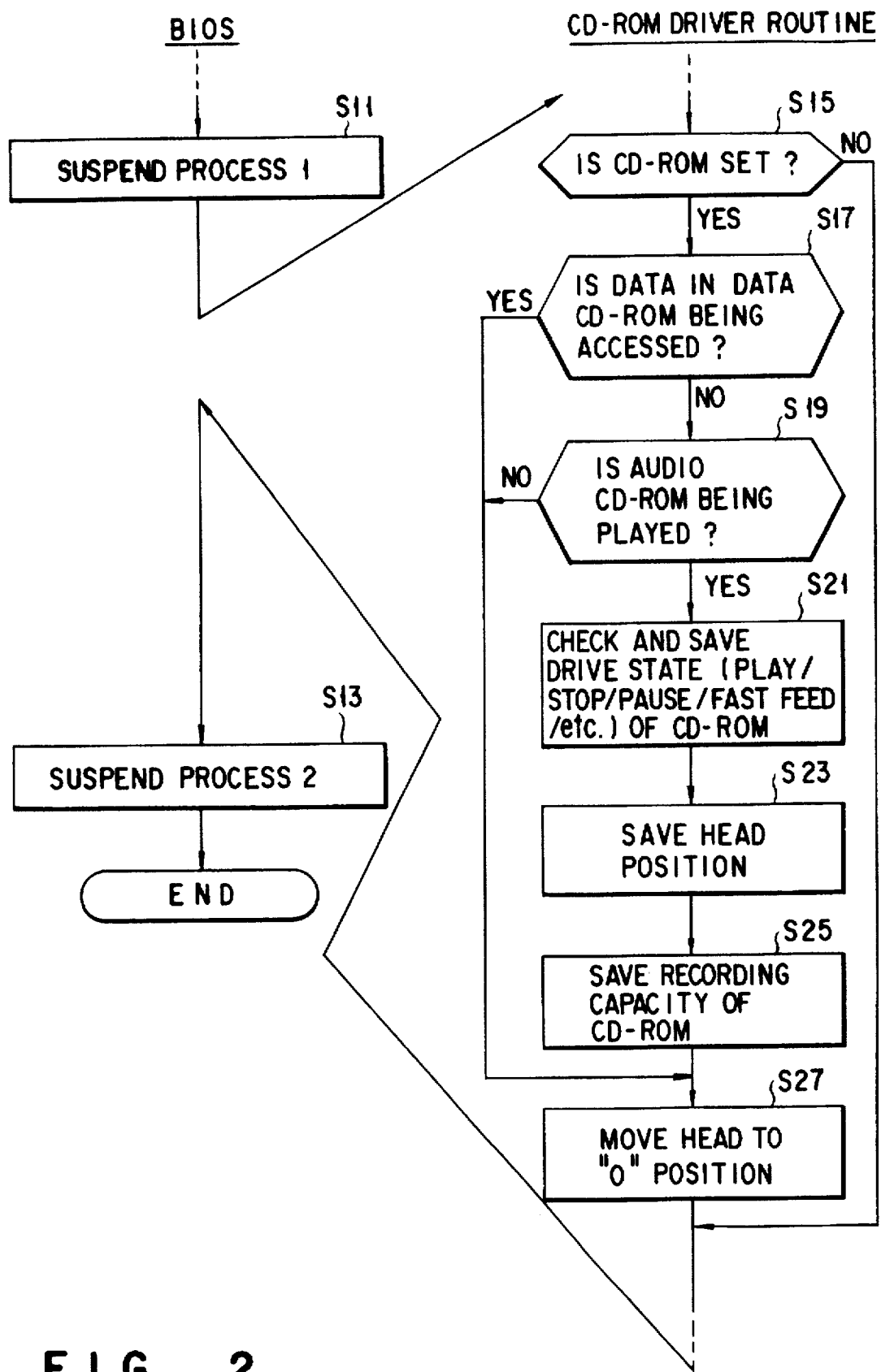
F I G. 2

PORTABLE COMPUTER HAVING A REMOVABLE MEDIUM DRIVE AND A RESUME SETTING FUNCTION

BACKGROUND OF THE INVENTION

1. Field of the Invention

The present invention relates to a portable computer having a CD-ROM drive and a resume setting function.

2. Description of the Related Art

Portable computers have recently been making great progress, and portable computers capable of processing speech information and time-varying information as well as character information are developed. Some of these portable computers have a resume function. If a resume mode is set, each information of a system is saved in a battery backup memory by a suspend process when a power supply of the system is turned off, and the condition immediately before the turn-off of the power supply is restored when the power supply is turned on. There are some of the portable computers having a resume function which include a CD-ROM drive for driving an audio CD-ROM as well as a data CD. In such a portable computer, when data is reproduced from the audio CD-ROM, the system issues a reproduction command to the CD-ROM drive. In response to the reproduction command, the CD-ROM drive reproduces data of the audio CD-ROM.

However, the above-described conventional portable computer has the following drawback. If, in the resume mode, the power supply is turned off during reproduction from the audio CD-ROM, the CD-ROM is replaced with another one, and the power supply is turned on again, then a resume error occurs and the whole system is not started.

The CD-ROM is generally classified into an audio CD-ROM on which music is recorded and a data CD-ROM on which programs and data are recorded. Conventionally, however, it is not determined whether an audio CD-ROM or a data CD-ROM is set in the CD-ROM drive. The CD-ROM drive therefore renders the set CD-ROM in the initial condition (moves a head to a "0" position, i.e., a home position) when power is on. Consequently, it is desired that, when an audio CD-ROM is set in the portable computer including a CD-ROM drive, a musical performance be restarted from the condition immediately before the power supply is turned off when the power supply is turned on again

SUMMARY OF THE INVENTION

An object of the present invention is to provide a portable computer having a CD-ROM drive and a resume function wherein even if, in the resume mode, the power supply of a system is turned off during the play of an audio CD-ROM and the CD-ROM is replaced with another one, the system can be restored to a condition in which the power supply is turned off, when the power supply is turned on again.

To attain the above object, there is provided a computer comprising: a power supply for supplying power to the computer; a data storage media drive; first determination means for, when a resume mode is set, determining whether a first media is set in the drive by turning off the power supply, the resume mode causing a system condition to be saved when the power supply is turned off, and causing the system condition to be restored to a condition immediately before the power supply is turned off, when the power supply is turned on again; retreat means for, when the first determination means determines that the first media is set in the drive, storing head position information and recording data amount information in the first media set in the drive and retreating a head to a predetermined position; second determination means for collecting recording data amount information in a second media set in the drive when the power supply is turned on, comparing the recording data amount information of the second media with that of the first media, and determining whether the second media is identical with the first media; and resume means for resuming a system other than the drive when the second determination means determines that the first and second are different from each other.

According to the configuration of the portable computer described above, if the power supply is turned off in the resume mode, information of the system condition, the head position of the CD-ROM, the drive conditions (play, stop, pause, fast-forward, etc.) of an audio CD-ROM, and the recording data amount (total performance time) of the audio CD-ROM are saved. When the power supply is turned on, it is checked whether a data CD-ROM or an audio CD-ROM is set in the CD-ROM drive. If the audio CD-ROM is set, it is compared with the saved recording data amount to determine whether the CD-ROMs before the power supply is turned off and after it is turned on are the same. If they are the same, the audio CD-ROM drive is resumed on the basis of the saved information of the head position and drive conditions of the audio CD-ROM, as is the system on the basis of the saved information of the system condition.

If the audio CD-ROM before the power supply is turned off and the audio CD-ROM after the power supply is turned on do not coincide with each other, the systems other than the CD-ROM drive are resumed.

With the above configuration, even though, in a resume mode, an audio CD-ROM is replaced with another one during the cutoff of the power supply and thus an error is caused, the other systems excluding the CD-ROM drive can be started. As a result, the system can be improved in operability.

According to the present invention, it is determined in the suspend process whether the set CD-ROM is a data CD-ROM or an audio CD-ROM. If the data CD-ROM is set, the head of the CD-ROM drive is moved to the "0" position. If the audio CD-ROM is set, the operability of the system can be improved further since the drive conditions of the CD-ROM at the cutoff of the power supply, the head position, and the recording capacity of the CD-ROM are stored.

BRIEF DESCRIPTION OF THE DRAWINGS

FIG. 1 is a block diagram showing a portable computer having a resume function of a CD-ROM according to an embodiment of the present invention;

FIG. 2 is a flowchart showing a suspend process routine of a CD-ROM driver executed by a driver routine of the CD-ROM driver and that of another system executed by a BIOS.

DETAILED DESCRIPTION OF THE PREFERRED EMBODIMENTS

Figure 3:
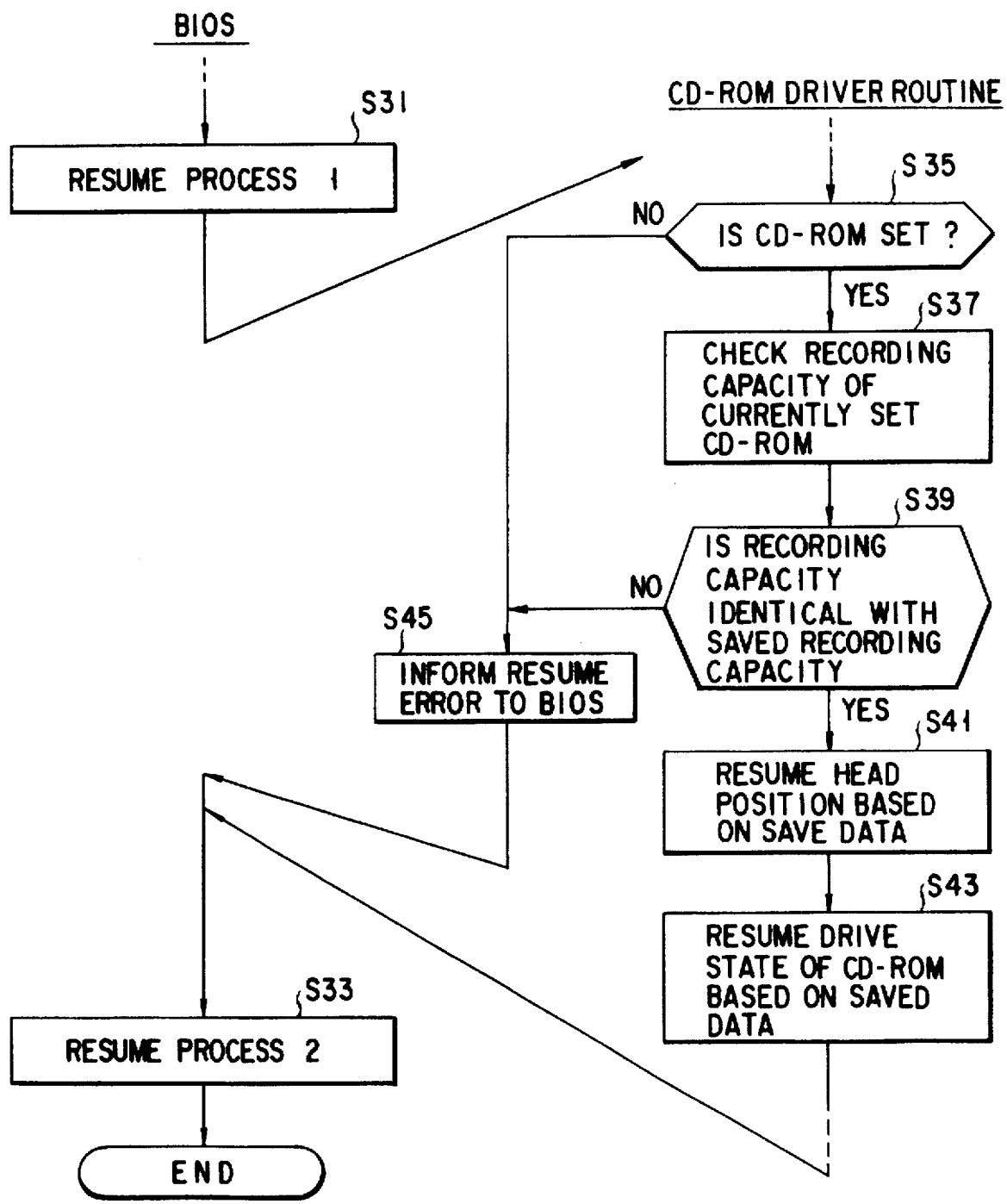
FIG. 3 is a flowchart showing a resume process routine of a CD-ROM driver executed by the driver routine of the CD-ROM driver and that of another system executed by the BIOS.

FIG. 1 is a block diagram showing a portable computer having a resume function of a CD-ROM driver.

The personal computer shown in FIG. 1 includes a CPU local bus (processor bus) 10A, an ISA system bus 10B, a CPU 11, a level shifting gate array 12, a system memory 13, a display controller 14, a video memory (VRAM) 15, and a flat panel display 16 such as an LCD.

The CPU 11 controls the whole system by executing an operating system stored in the system memory 13 and executes programs such as an application program. The CPU 11 also executes a suspend/resume process routine stored in a BIOS ROM 17 and, in other words, it executes a suspend process, shown in FIG. 2, when a power supply of the system is turned off and does a resume process, shown in FIG. 3, when the power supply is turned on.

For example, microprocessor SL Enhanced Intel 486 operable at 3V/5V, manufactured by Intel can be applied to the CPU 11. A power supply voltage of 3.3V is applied to the CPU 11 from a power supply controller 23 which will be described later. The local bus 10A of the CPU 11 includes a 32-bit data bus, a 32-bit address bus, and various status signal lines.

The system memory 13 stores an operating system, an application program to be executed, user's data produced by the application program, etc. The system memory 13 is constituted of a dynamic RAM operated at 5V.

Part of a storage area of the system memory, which is backed up by a battery, is used as an information storage area (CD-ROM information storage area) 13A of the suspend/ resume process for the CD-ROM drive.

The CPU 11 stores information of drive condition of a CD-ROM collected by the suspend process, that of position of a head, that of amount of data recorded on the CD-ROM, etc., in the CD-ROM information storage area 13A and reads the stored information from the area 13A in the resume process.

The level shifting gate array 12 is connected between the system memory 13 and CPU cache 11 through the 32-bit data bus defined in the CPU local bus 10A, and converts the voltage level of a data signal on the data bus from 3.3V to 5V or from 5V to 3.3V. The voltage level conversion of the data signal is performed by a buffer circuit in the level shifting gate array 12. In order to execute a CPU bus cycle and a read access cycle of the system memory 13 asynchronously with each other, the buffer circuit has a data latch function of latching data read out of the system memory 13.

The display controller 14 is designed to control the flat panel display 16 constituted of an STN monochrome panel, an STN color panel, a TFT color LCD panel or the like. The controller 14 receives display data from the CPU 11 via the CPU local bus 10A and writes it to the video memory (VRAM) 15.

The BIOS ROM 17, system controller 18, and I/O controller 19 are connected to the system bus 10B (e.g., ISA-BUS and PCI bus).

The BIOS ROM 17 is constituted of a rewritable flash memory to store a system BIOS (Basic I/O System). The system BIOS contains a boot process routine executed when power is on, a suspend/resume process routine as shown in FIGS. 2 and 3, a device driver for controlling various types of I/O device, a system management program, a setup program, etc.

The system controller 18 includes a bridge device connecting the CPU local bus 10A and system bus 10B and a memory control logic for controlling various types of memory in the system.

The I/O controller 19 controls an I/O device connected to a serial port 20, a printer/external FDD connected to a parallel port (printer port) 21, an internal FDD of 3.5 inches, etc. The I/O controller 19 includes two DMA controllers for direct access to the memories, two interrupt controllers (PIC: Programmable Interrupt Controller), one system timer (PIT: Programmable Interval Timer), two serial I/O controllers (SIO: Serial Input/Output Controller), and one floppy disk controller (FDC).

The I/O controller 19 also includes a group of I/O registers used for communications between a power supply controller (PSC) 23 and CPU 11 and a group of I/O registers for setting the environment of the parallel port 21.

Furthermore, an internal HDD 24, a real time clock (RTC) 25, a keyboard controller (KBC) 26, a PCMCIA controller 27, a CD-ROM 34 and a sound card 35 are connected to the system bus 10B.

The CD-ROM 34 has a driver routine of the CD-ROM and executes a suspend/resume process in the enabled resume mode. More specifically, in the driver routine of the CD-ROM, a suspend process for the CD-ROM driver 34 is executed, as shown in FIG. 2, when the power supply is turned off, and a resume process, as shown in FIG. 3, is done when the power supply is turned off.

The real time clock (RTC) 25 is a clock module having its own operating battery and includes a CMOS static RAM (referred to as a CMOS memory) to which a power supply voltage is normally applied from the battery. The CMOS memory is used, for example, to retain environment setting information indicative of the operation environment of the system.

The keyboard controller (KBC) 26, which is intended to control an internal keyboard 29 incorporated into the computer body, scans a key matrix of the internal keyboard 29, receives a signal corresponding to a depressed key, and converts it into a predetermined key code (scan code).

The keyboard controller 26 has a function of controlling an optionally connected external keyboard 30 and that of controlling a pointing stick 31 and a mouse 32 using a dedicated processor (IPS controller) 28. The pointing stick 31 is provided on a keyboard unit of the internal keyboard 29 such that they are integrally formed as one component.

The PCMCIA controller 27 controls the access of an optionally mounted PC card 33 of JEIDA/PCMCIA. The sound card 35 includes a PCM sound source, a circuit for digitally processing a voice signal, and the like. A line input terminal 36, a line output terminal 37, a headphone terminal 38, a microphone terminal 39, and a joy stick terminal 40, are connected to the sound card 35. A power supply 41 outputs a voltage Vmain while the computer is in operation and a voltage Vbak while the computer is being suspended.

FIG. 2 is a flowchart showing the suspend process executed under the control of the CPU 11 when the power supply is turned off in the resume mode. The suspend process of the system is executed after that of the CD-ROM drive 34.

FIG. 3 is a flowchart showing the resume process executed under the control of the CPU 11 when the power supply is turned on in the enabled resume mode (a user selects one of enabled and disabled resume modes on the setup menu screen). The resume process of the CD-ROM drive 34 is executed after that of the system.

An operation of the portable computer according to the embodiment of the present invention, will now be described with reference to the respective figures indicated above.

Referring first to FIG. 2, the suspend process executed when the power supply is turned off will be described.

When the resume mode is enable, the CPU 11 executes the suspend process, shown in FIG. 2, in response to the turn-off of the power supply.

First in step S11, the CPU 11 executes a suspend process 1 alongside the system. The CPU 11 then executes a CD-ROM driver routine to execute a resume process to execute the resume process of the CD-ROM drive 34. In other words, the CPU 11 determines whether the CD-ROM is set or not in step S15. If, in this step, the CPU 11 determines that the CD-ROM is set in the CD-ROM drive 34, then it determines whether data of a data CD-ROM is accessed by the CD-ROM 34 in step S17. This determination is performed by accessing a holding circuit provided in the CD-ROM drive and accessing identification information (indicating whether a data reproducing CD-ROM or an audio reproducing CD-ROM) stored in the holding circuit. While the data CD-ROM is being accessed, the flow advances to step S27, in which the CPU 11 moves the head of the CD-ROM drive 34 to the "0" position and informs the system (e.g., BIOS) of the completion of the resume process.

If the CPU 11 determines in step S17 that data of the data CD-ROM is not accessed, then it determines whether the audio CD-ROM is being played in step S19. If it is determined in step S29 that the audio CD-ROM is not being played, the flow goes to step S27 where the CPU 11 performs the foregoing operation.

If, in step S19, the CPU 11 determines that the audio CD-ROM is being played, it recognizes the drive condition (play, stop, pause, fast-forward, etc.) of the audio CD-ROM and stores it in the CD-ROM information storage area 13A.

In step S23, the CPU 11 recognizes the present position of the head of the CD-ROM drive 34 and stores it in the area 13A and, in step S25, it recognizes the capacity of data recorded on the CD-ROM and stores the capacity information (e.g., total performance time).

The flow then goes to step S27, in which the CPU 11 controls the CD-ROM drive 34 such that its head moves to (retreats from) the "zero" position.

After the CPU 11 executes the suspend process for the CD-ROM drive 34, it informs the BIOS of the completion of the resume process.

In step S13, the BIOS executes suspend process 2 of the system, and cuts off the power of the system after the completion of the suspend process.

The suspend process executed when the power supply is turned on, will now be described with reference to FIG. 3.

The CPU 11 executes the resume process, as shown in FIG. 3, in response to the turn-on of the power supply when the resume mode is enabled.

First, in step S31, the CPU 11 executes resume process 1 of the system.

The CPU 11 then executes a driver routine of the CD-ROM drive 34. In other words, in step S35, the CPU 11 determines whether an audio CD-ROM is set or not. If it is not set, the CPU 11 informs the BIOS of an resume error in step S45.

If, in step S35, the CPU 11 determines that an audio CD-ROM is set, it collects information of the recording data capacity of the currently-set CD-ROM in step S37. In step S39, the CPU 11 compares the collected information with that of recording data capacity stored in the CD-ROM information storage area 13A when the power supply is turned off (step S25 in FIG. 2). If they coincide with each other, the CPU 11 determines that the currently-set CD-ROM is the same medium as that when the power supply is turned off.

If, in step S39, the CPU 11 determines that both CD-ROMs are the same medium, it returns the head of the CD-ROM drive 34 to the position immediately before the power is cut off, based on the positional information of the head stored in the CD-ROM information storage area 13A in step S41. In step S43, the CPU 11 restores the drive condition (play, stop, pause, fast-forward) of the CD-ROM based on CD-ROM drive condition information stored in the CD-ROM information storage area 13A.

Thus, the resume process including the CD-ROM drive 34 is completed.

The above-described suspend/resume process including the CD-ROM drive 34 has the following advantage. Even though the power supply is turned off in the middle of the processing involving CD-ROM access and audio CD-ROMs are exchanged to cause a resume error in the CD-ROM drive, the configurations of systems other than the CD-ROM drive can be restored to the condition set at the time of the turn-off of the power supply, when the system is turned on again. It is thus possible to prevent the whole system from being hung up by the resume error of the CD-ROM drive.

The present invention is not limited to the above embodiment. For example, the present invention can be applied not only to an audio CD but also a motion picture CD. Furthermore, the present invention can be applied not only to a combination of a CD and a CD-ROM but also to a combination of a media and its drive for reproducing audio data and/or motion picture data.

Further, the present invention can be applied not only to a portable computer but also to a desk top computer having a resume function.

Further, the suspended data may be stored not only in a battery backed-up memory but also in a non-volatile memory such as a HDD.

What is claimed is:

1. A computer comprising:

a power supply for supplying power to said computer;

a removable medium drive;

first determination means for, when a resume mode is set, determining whether a first removable medium is set in said removable medium drive by turning off said power supply, said resume mode causing a system condition to be saved when said power supply is turned off, and causing the system condition to be restored to a condition immediately before said power supply was turned off, when said power supply is turned on again;

retreat means for, when said first determination means determines that the first removable medium is set in said removable medium drive, storing head position information and recording data amount information in the first removable medium set in said removable medium drive and retreating a head to a predetermined position;

second determination means for collecting recording data amount information in a second removable medium set in said removable medium drive when said power supply is turned on, comparing the recording data amount information of the second removable medium with that of the first removable medium, and determining whether the second removable medium is identical with the first removable medium; and resume means for resuming a system other than said removable medium drive when said second determination means determines that the first removable medium and second removable medium are different from each other.

2. The computer according to claim 1, wherein said second determination means includes means for determining that the first and second removable media are identical, based on total performance time of an audio and/or picture removable medium.

3. The computer according to claim 1, wherein said removable medium drive includes means for holding information for determining whether the first removable medium set in said removable medium drive is a data removable medium or an audio and/or picture removable medium.

4. The computer according to claim 2, wherein said removable medium drive includes means for holding information for determining whether the first removable medium set in said removable medium drive is a data removable medium or an audio and/or picture removable medium.

5. The computer according to claim 1, wherein the removable medium is a data storage disk and the removable medium drive is a disk drive.

6. The computer according to claim 5, wherein the data storage disk is a CD-ROM and the disk drive is a CD-ROM drive.

7. A computer comprising:
    a power supply for supplying power to said computer;
    a removable medium drive;
    first determination means for, when a resume mode is set, determining whether a first removable medium is set in said removable medium drive by turning off said power supply, said resume mode causing a system condition to be saved when said power supply is turned off, and causing the system condition to be restored to a condition immediately before said power supply was turned off, when said power supply is turned on again;
    second determination means for, when said first determination means determines that the first removable medium is set in said removable medium drive, determining whether the first removable medium is a data removable medium or an audio and/or picture removable medium;
    means for, when said second determination means determines that the first removable medium is the data removable medium, moving a head of said removable medium drive to a home position and; when said second determination means determines that the first removable medium is the audio and/or picture removable medium, storing head position information and recording data amount information in the first removable medium and retreating the head to a predetermined position;
    third determination means for collecting recording data amount information in a second removable medium set in said removable medium drive when said power supply is turned on, comparing the recording data amount information of the second removable medium with that of the first removable medium, and determining whether the second removable medium is identical with the first removable medium; and
    resume means for resuming a system other than said removable medium drive when said second determination means determines that the first and second removable media are different from each other.

8. The computer according to claim 7, wherein said third determination means includes means for determining that the first and second removable media are identical, based on total performance time of the audio and/or picture removable medium.

9. The computer according to claim 7, wherein said removable medium drive includes means for holding information for determining whether the first removable medium set in said removable medium drive is a data removable medium or an audio and/or picture removable medium.

10. The computer according to claim 8, wherein said removable medium drive includes means for holding information for determining whether the first removable medium set in said removable medium drive is a data removable medium or an audio and/or picture removable medium.

11. The computer according to claim 7, wherein the removable medium is a data storage disk and the removable medium drive is a disk drive.

12. The computer according to claim 11, wherein the data storage disk is a CD-ROM and the disk drive is a CD-ROM drive.

13. A resume control method in a computer which reproduces media each having different recording capacity, comprising the computer executed steps of:
    determining, when a resume mode is set, whether a first removable medium is set in a removable medium drive by turning off a power supply, said resume mode causing a system condition to be saved when said power supply is turned off, and causing the system condition to be restored to a condition immediately before said power supply was turned off, when said power supply is turned on again;
    storing, when said first determination means determines that the first removable medium is set in said removable medium drive, head position information and recording data amount information in the first removable medium set in said removable medium drive;
    obtaining recording data amount information in a second removable medium set in said removable medium drive when said power supply is turned on, comparing the recording data amount information of the second removable medium with that of the first removable medium, and determining whether the second removable medium is identical with the first removable medium; and
    resuming a system other than said removable medium drive when the first removable medium and second removable medium are determined to be different from each other.

14. A resume control method in a computer which reproduces media each having different recording capacity, comprising the computer executed steps of:
    determining, when a resume mode is set, whether a first removable medium is set in a removable medium drive by turning off said power supply, said resume mode causing a system condition to be saved when said power supply is turned off, and causing the system condition to be restored to a condition immediately before said power supply was turned off, when said power supply is turned on again;
    determining, the first removable medium is determined to be set in said removable medium drive, whether the first removable medium is a data removable medium or an audio and/or picture removable medium;
    moving, when the first removable medium is determined to be the data removable medium, a head of said removable medium drive to a home position and, when the first removable medium is determined to be the audio and/or picture removable medium, storing head position information and recording data amount information in the first removable medium and retreating the head to a predetermined position;
    obtaining recording data amount information in a second removable medium set in said removable medium drive when said power supply is turned on, comparing the recording data amount information of the second removable medium with that of the first removable medium, and determining whether the second removable medium is identical with the first removable medium; and resuming a system other than said removable medium drive when the first and second removable media are determined to be different from each other.

* * * * *